United States Patent
Joyce et al.

(10) Patent No.: US 12,519,400 B2
(45) Date of Patent: Jan. 6, 2026

(54) TWO-SWITCH EXCITER DRIVE ARCHITECTURE WITH SINGLE SWITCH MODES

(71) Applicant: Hamilton Sundstrand Corporation, Charlotte, NC (US)

(72) Inventors: Thomas P. Joyce, Rockford, IL (US); John F. Defenbaugh, Rockford, IL (US); Barry Drager, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 223 days.

(21) Appl. No.: 18/080,214

(22) Filed: Dec. 13, 2022

(65) Prior Publication Data

US 2024/0195314 A1    Jun. 13, 2024

(51) Int. Cl.
*H02M 1/088* (2006.01)
*H02M 1/32* (2007.01)
(Continued)

(52) U.S. Cl.
CPC .......... *H02M 5/293* (2013.01); *H02M 1/088* (2013.01); *H02M 1/32* (2013.01); *H03K 19/20* (2013.01)

(58) Field of Classification Search
CPC .......... H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08;
(Continued)

(56) References Cited

U.S. PATENT DOCUMENTS 4,297,621 A * 10/1981 Spilsbury ............... H03K 4/696
                                                    315/403
5,166,591 A * 11/1992 Stephens ................ H02P 9/40
                                                    318/701
(Continued)

OTHER PUBLICATIONS

Partial European Search Report dated Apr. 24, 2024 in connection with European Patent Application No. 23216434.3, 13 pages.
(Continued)

*Primary Examiner* — Sean Kayes
*Assistant Examiner* — Nusrat Quddus

(57) ABSTRACT

A system includes a two-switch H-bridge topology, which has a first switch with a first gate drive connected to control on and off states of the first switch. A second switch has a second gate drive connected to control on and off states of the second switch. An exciter winding is connected from a first node between the first switch and a second flyback diode to a second node between a first flyback diode and the second switch. A controller is connected to control the first gate drive and the second gate drive in a mode wherein the first switch is always on while the second cycles as a duty-cycle-controlled switch element for the exciter winding.

20 Claims, 5 Drawing Sheets

(51) Int. Cl.
*H02M 5/293* (2006.01)
*H03K 19/20* (2006.01)

(58) Field of Classification Search
CPC .. H02M 7/17; H02M 2001/007; H02M 7/493;
H02M 7/53806; H02M 7/5381; H02M
7/483; H02M 7/217; H02M 7/538466;
H02M 7/5387; H02M 7/53871; H02M
7/53873; H02M 7/53875; H02M 1/084;
H02M 1/0845; H02M 1/32; H02M
2001/322; H02M 2001/327; H02M 1/34;
H02M 2001/342; H02M 2001/344; H02M
2001/346; H02M 2001/348; H02M 1/38;
H02M 1/42; H02M 1/4208; H02M
1/4216; H02M 1/4225; H02M 1/4233;
H02M 1/4241; H02M 1/425; H02M
1/4258; H02M 1/4266; H02M 2001/4275;
H02M 2001/4283; H02M 2001/4291;
Y02B 70/1491; H02J 3/46; H02J 3/38;
H02J 3/1878; H01F 29/00; H01F 29/02;
H01F 29/025; H01F 29/04; G05F 1/10;
G05F 1/12; G05F 1/14; G05F 1/147;
G05F 1/153; G05F 1/16; G05F 1/20;
G05F 1/22; G05F 1/24; G05F 1/247;
G05F 1/253; G05F 1/26; G05F 1/30;
H01H 9/0005; H02H 7/055
See application file for complete search history.

(56) References Cited

U.S. PATENT DOCUMENTS

| | | | |
|---|---|---|---|
| 5,440,539 A | 8/1995 | Nagler | |
| 5,850,138 A | 12/1998 | Adams et al. | |
| 6,850,043 B1 | 2/2005 | Maddali | |
| 7,336,059 B2* | 2/2008 | Steigerwald | H01F 6/006 |
| | | | 323/225 |
| 7,466,109 B1 | 12/2008 | Arsen et al. | |
| 8,970,183 B2 | 3/2015 | Maddali et al. | |
| 9,729,144 B2* | 8/2017 | Esmaeili | H03K 17/61 |
| 9,871,479 B2 | 1/2018 | Joyce et al. | |
| 11,424,612 B2 | 8/2022 | Huang et al. | |
| 11,552,550 B2* | 1/2023 | Nosaka | H02M 7/5387 |
| 11,699,966 B1* | 7/2023 | Fox | H02P 29/0241 |
| | | | 322/59 |
| 2006/0049814 A1* | 3/2006 | Drobnik | H02M 3/158 |
| | | | 323/282 |
| 2006/0062024 A1* | 3/2006 | Hosotani | H02M 3/3385 |
| | | | 363/16 |
| 2009/0262556 A1* | 10/2009 | Tomiyoshi | H02M 3/1582 |
| | | | 363/17 |
| 2012/0039093 A1* | 2/2012 | Miftakhutdinov | H02M 3/3378 |
| | | | 363/17 |
| 2017/0012536 A1* | 1/2017 | Lin | H02M 3/33584 |

OTHER PUBLICATIONS

Hirsch et al., "Applications of Digital PWM Integrated Circuits," Proceeding of the Annual Applied Power Electronics Conference and Exposition, vol. 1, No. 1, May 1986, 7 pages.
Inderka et al., "Generator Operation of a Switched Reluctance Machine Drive for Electric Vehicles," 8th European Conference on Power Electronics and Applications, Sep. 1999, 9 pages.
Watkins et al., "Multilevel Asymmetric Power Converters for Switched Reluctance Machines," 2002 International Conference on Power Electronics, Machines and Drives, Jun. 2002, 6 pages.
European Search Report dated Aug. 19, 2024 in connection with European Patent Application No. 23216434.3, 14 pages.
Hunter, "A Reliable, Low Cost IGBT Gate Drive Circuit," 2008 Australasian Universities Power Engineering Conference, IEEE, Dec. 2008, 4 pages.
Hui et al., "Optimal Operation of Coreless PCB Transformer-Isolated Gate Drive Circuits with Wide Switching Frequency Range," IEEE Transactions on Power Electronics, vol. 14, No. 3, May 1999, 9 pages.

* cited by examiner

TWO-SWITCH EXCITER DRIVE ARCHITECTURE WITH SINGLE SWITCH MODES

BACKGROUND

1. Field

The present disclosure relates to exciter drives, and more particularly to two-switch H-bridge topologies.

2. Description of Related Art

Generator control unit (GCU) exciter drive topologies usually consist of a two-switch H-bridge topology in variable frequency (VF) systems, and sometimes in constant frequency (CF) systems, due to the need to quickly remove energy from the exciter field in fault conditions to prevent overvoltage on the generator output. The two-switch topology allows for exciter current rate of change that is proportional to the DC link power supply voltage (typically 100-300 Volts) during the off-time rather than a rate of change that is only proportional to a flyback diode forward voltage as in a single-switch topology. This two-switch topology allows for energy removal from the exciter field much more quickly than with the single-switch topology, but the two-switch topology has the undesired consequence of additional power dissipation in the additional flyback diode and additional switching transistor.

The conventional techniques have been considered satisfactory for their intended purpose. However, there is an ever present need for improved systems and methods for exciter drives. This disclosure provides a solution for this need.

SUMMARY

A system includes a two-switch H-bridge topology, which has a first switch with a first gate drive connected to control on and off states of the first switch. A second switch has a second gate drive connected to control on and off states of the second switch. A first flyback diode is connected in series between an exciter load negative side node and a voltage supply line. A second flyback diode is connected in series between an exciter load positive node and a voltage return line. The first and second flyback diodes are each oriented to provide a flyback current path. An exciter winding is connected from a first node between the first switch and the second flyback diode to a second node between the first flyback diode and the second switch. A controller is connected to control the first gate drive and the second gate drive in a mode wherein the first switch is always on while the second cycles as a duty-cycle-controlled switch element for the exciter winding.

A first transformer can have a primary winding operatively coupled to energize a secondary winding. The secondary winding can be operatively connected to the first gate drive. The secondary winding can connect between the first gate drive and the first node. A second transformer can have a primary winding operatively coupled to energize a secondary winding. The secondary winding of the second transformer can be operatively connected to the second gate drive. The secondary winding of the second transformer can connect between the second gate drive and the return line.

A first AND gate can be connected to control the first gate drive. The first AND gate can have a first input for a carrier signal, and a second input for a first pulse width modulation (PWM) command. The first AND gate can connect to a first terminal of the primary winding of the first transformer through a first amplifier. The first AND gate can connect to a second terminal of the primary winding of the first transformer through a first inverting amplifier.

A second AND gate can be connected to control the second gate drive. The second AND gate can have a first input for the carrier signal and a second input for a second PWM command. The second AND gate can connect to a first terminal of the primary winding of the second transformer through a second amplifier. The second AND gate can connect to a second terminal of the primary winding of the second transformer through a second inverting amplifier. The controller can include machine readable instructions configured to cause the controller to perform methods as disclosed herein.

A method includes driving an exciter with a two-switch h-bridge topology having a first switch and a second switch. Driving the exciter includes leaving the first switch on and controlling the second switch as a duty-cycle-controlled switch element.

The method can include switching the first switch to off during a fault. The method can include changing modes so the second switch remains on while the first switch acts as the duty-switch-cycle-controlled switch element. The method can include changing modes between having the first switch or the second switch acting as the duty-switch-cycle-controlled switch element. Changing modes can be performed to manage thermal performance of the two-switch h-bridge topology.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
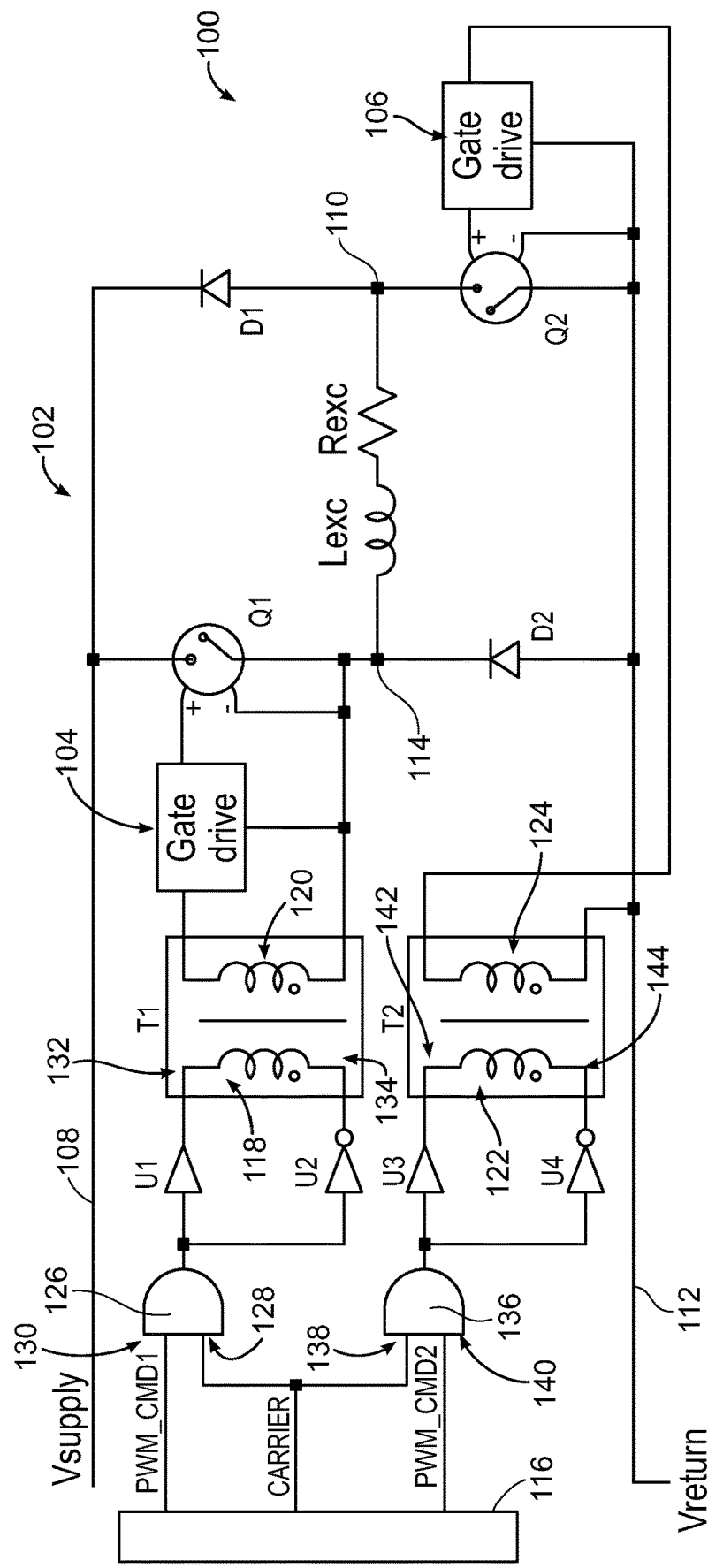
FIG. 1 is a schematic view of an embodiment of a system constructed in accordance with the present disclosure, showing the two-switch H-bridge topology.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide one switch operation of a two-switch H-bridge topology, with fault protection and thermal management functions.

A system 100 includes a two-switch H-bridge topology 102 in which a first switch Q1 has a first gate drive 104 connected to control on and off states of the first switch Q1. A second switch Q2 has a second gate drive 106 connected to control on and off states of the second switch Q2. A first flyback diode D1 is connected in series between the exciter load negative side 110 and a voltage supply line 108. A second flyback diode D2 is connected in series between the exciter load positive node 114 and a voltage return line 112, e.g. which connects to the return line Vreturn. Both flyback diodes D1 and D2 are oriented to provide a flyback current path when current is interrupted from flowing from the first switch Q1 from the supply line 108 to the exciter load Lexc and Rexc and through the second switch Q2 to the voltage return line 112. An exciter winding with inductance Lexc, and resistance Rexc, is connected from the node 114 between the first switch Q1 and the second flyback diode D2 to the node 110 between the first flyback diode D1 and the second switch Q1.

A controller 116 is connected to control the first gate drive 104 and the second gate drive 106 in a mode wherein one of the switches Q1, Q2 is always on while the second switch Q1, Q2 cycles as a duty-cycle-controlled switch element for the exciter winding Lexc and Rexc.

A first transformer T1 has a primary winding 118 operatively coupled to energize a first gate drive through T1 secondary winding 120. The T1 secondary winding 120 is operatively connected to the first gate drive 104. The T1 secondary winding 120 connects between the first gate drive 104 and the exciter load positive node 114. A second transformer T2 has a primary winding 122 operatively coupled to energize a second gate drive through T2 secondary winding 124. The T2 secondary winding 124 is operatively connected to the second gate drive 106. The T2 secondary winding 124 connects between the second gate drive 106 and the return line 112.

A first AND gate 126 is connected to control the first gate drive 104. The first AND gate 126 has a first input 128 for a carrier signal, and a second input 130 for a first pulse width modulation (PWM) command. The first AND gate 126 connects to a first terminal 132 of T1 primary winding 118 through a first amplifier U1. The first AND gate 126 connects to a second terminal 134 of the T1 primary winding 118 through a first inverting amplifier U2.

A second AND gate 136 is connected to control the gate drive 106. The second AND gate 136 has a first input 138 for the carrier signal and a second input 140 for a second PWM command. The second AND gate 136 connects to a first terminal 142 of the T2 primary winding 122 through a second amplifier U3. The second AND gate 136 connects to a second terminal 144 of the T2 primary winding 122 through a second inverting amplifier U4. The controller 116 is connected to the AND gates 126, 136 to provide the carrier signal and first and second PWM commands, and includes machine readable instructions configured to cause the controller to perform methods as disclosed herein.

Figure 2:
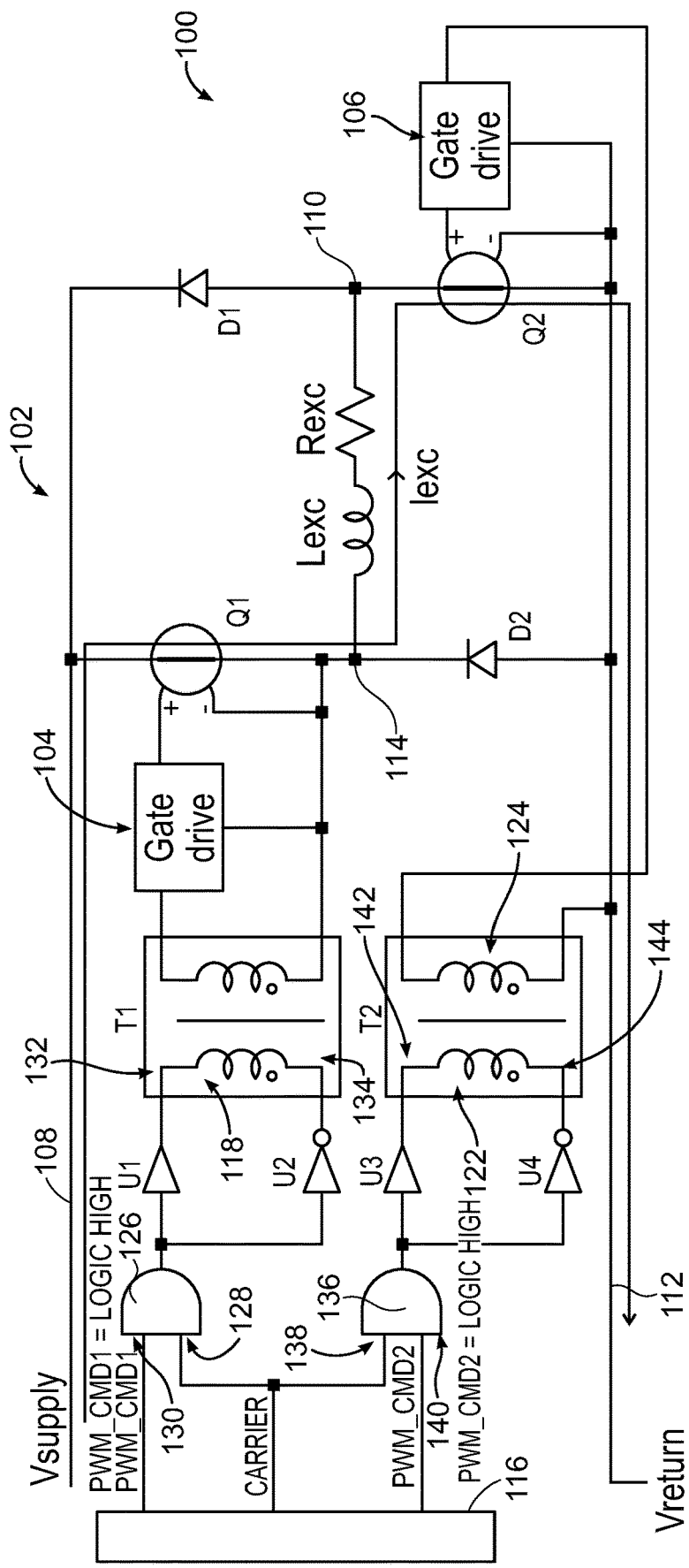
FIG. 2 is a schematic view of the system of FIG. 1, showing both of the switches in the ON state.
Figure 4:
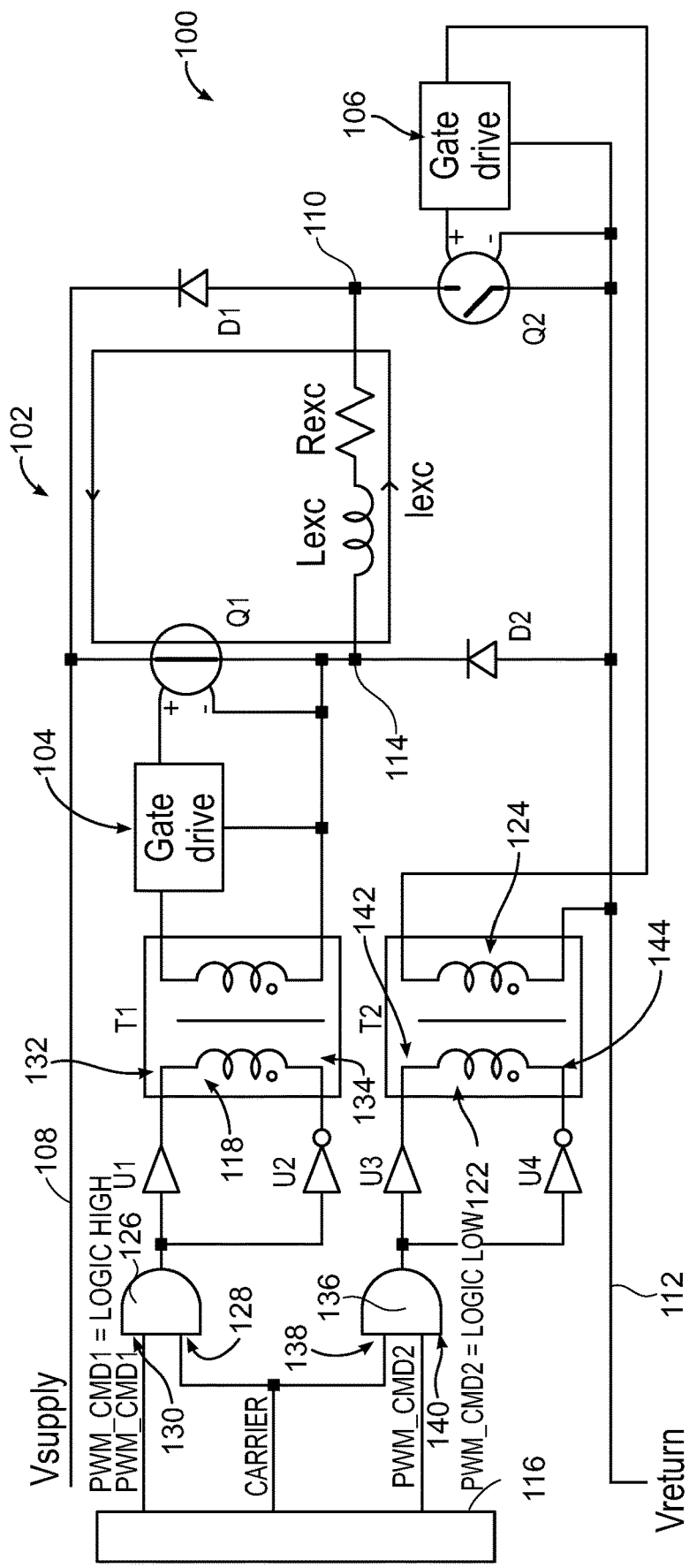
FIG. 4 is a schematic view of the system of FIG. 1, showing flyback with the first switch in the ON state and the second switch in the OFF state.

A method includes driving an exciter, e.g. exciter winding Lexc and Rexc, with a two-switch h-bridge topology 102 as described above. Driving the exciter includes leaving the first switch, e.g. switch Q1, on and controlling the second switch, e.g. switch Q2, as a duty-cycle-controlled switch element. Referring two FIGS. 2 and 4, this would involve keeping the first PWM command at a logic high as shown in FIGS. 2 and 4, while alternating the second PWM command between logic high and logic low, switching between the states shown in FIGS. 2 and 4.

Figure 5:
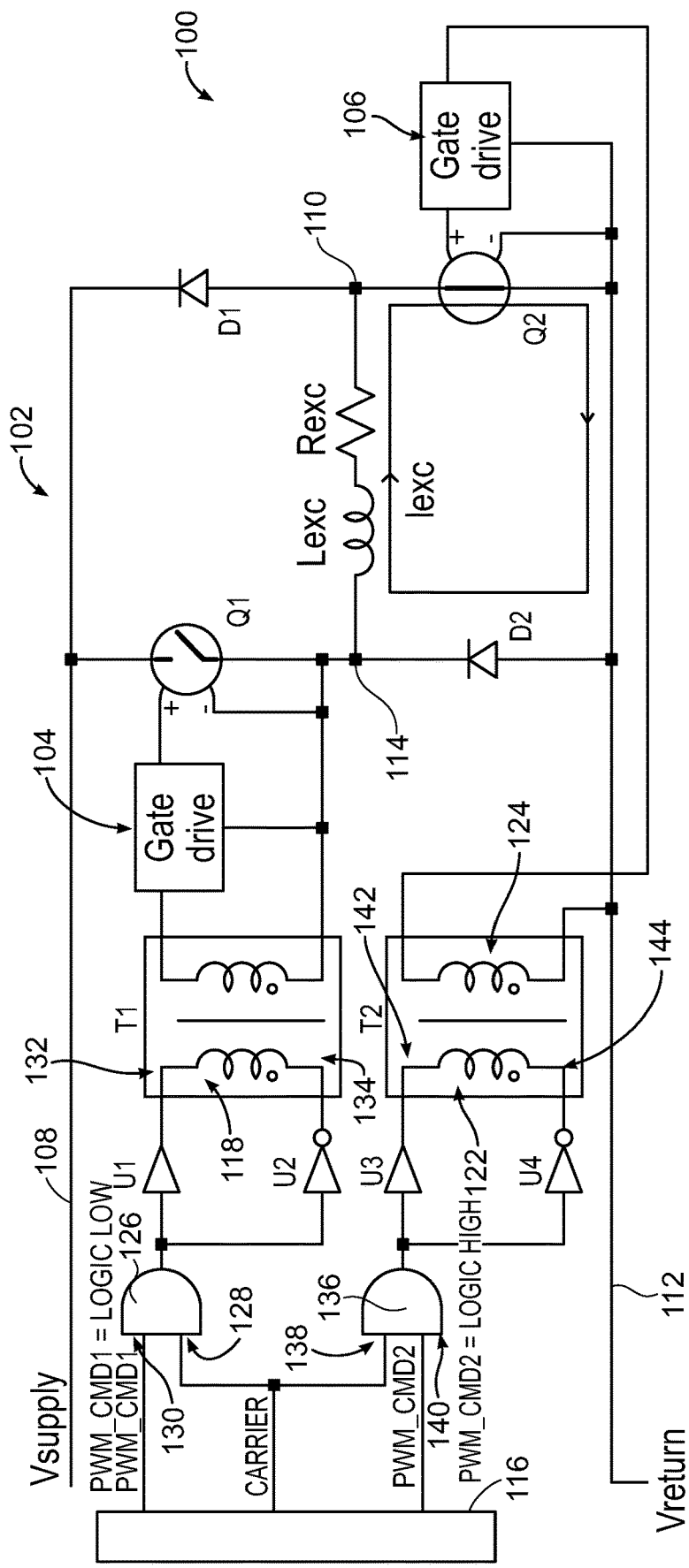
FIG. 5 is a schematic view of the system of FIG. 1, showing flyback with the second switch in the ON state and the first switch in the OFF state.

It is also possible to use the second switch Q2 as the always on switch, and the first switch Q1 as the duty-cycle-controlled switch element. Referring to FIGS. 2 and 5, this would involve keeping the second PWM command at a logic high as shown in FIGS. 2 and 5, and alternating the first PWM command between logic high and logic low, switching between the states shown in FIGS. 2 and 5.

Figure 3:
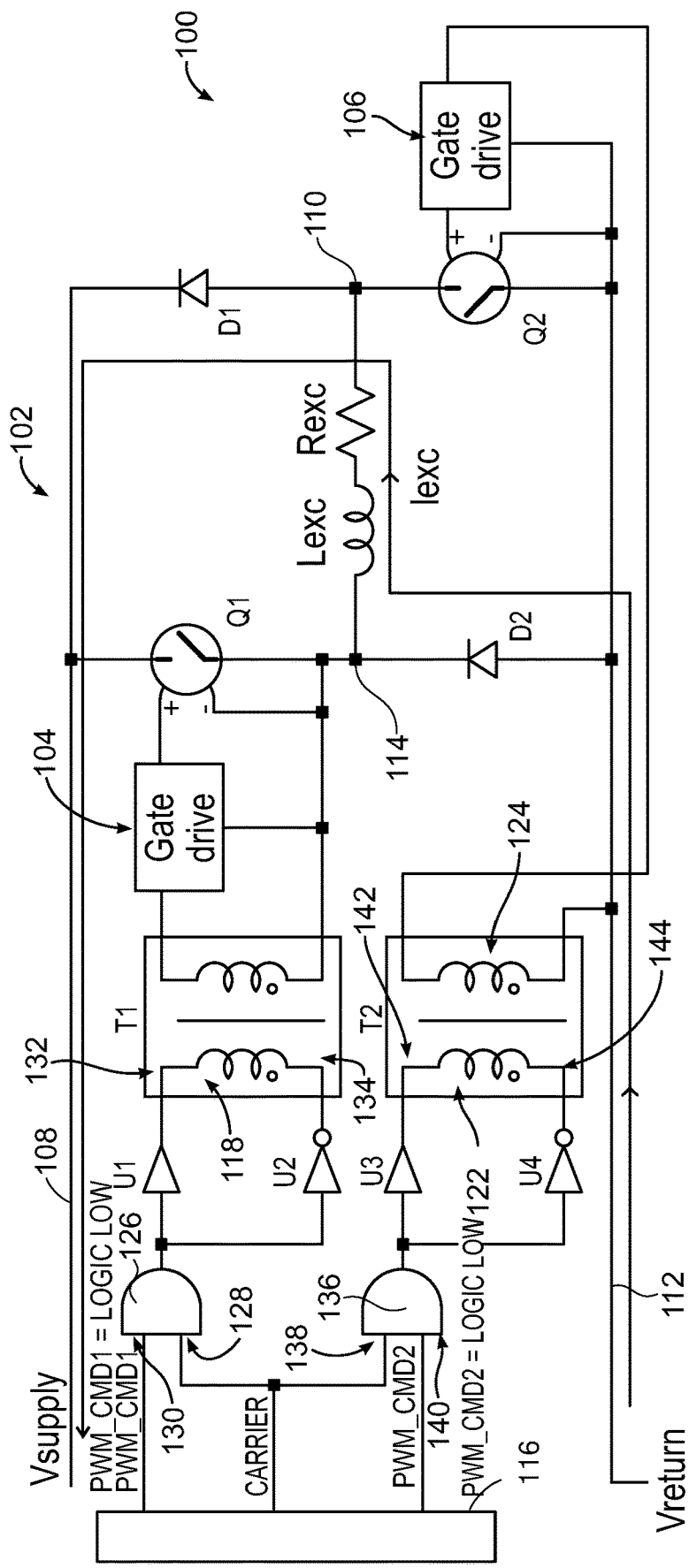
FIG. 3 is a schematic view of the system of FIG. 1, showing both of the switches in the OFF state.

The method can include switching the first switch to off during a fault, e.g. sending a logic low to whichever of the switches is acting as the always on switch, or sending the PWM command for a logic low to both switches as shown in FIG. 3. The method can include changing modes, so the second switch remains on while the first switch acts as the duty-switch-cycle-controlled switch element. For example, in a first mode the first switch Q1 is the always on switch, and in a second mode the second switch Q2 is the always on switch. The method can include changing modes between having the first switch or the second switch acting as the duty-switch-cycle-controlled switch element. Changing modes can be performed to manage thermal performance of the two-switch h-bridge topology.

The state shown in FIG. 3 allows energy to be removed quickly from the exciter field of the exciter winding Lexc and Rexc. The state shown in FIG. 4 allows the flyback diode D2 to avoid dissipating power during the off time of the switch Q2 and allows the first switch Q1 to avoid switching losses by remaining closed (on) during the off time of the second switch Q2, reducing power dissipation in the exciter drive. The state shown in FIG. 5 allows the flyback diode D1 to avoid dissipating power during the off time of the first switch Q1 and allows the second switch to avoid switching losses by remaining closed (on) during the off time of the first switch Q1, reducing power dissipation in the exciter drive.

Systems and methods as disclosed herein allow for the switching transistors Q1 and Q2 to be controlled independently to allow for a new state 3 (Q1 on, Q2 off shown in FIG. 4) and a new state 4 (Q1 off, Q2 on, shown in FIG. 5). When alternating between states 1&3 (alternating between FIG. 2 and FIG. 4, Q1 always on, Q2 switching) or between states 1&4 (alternating between FIG. 2 and FIG. 5, Q1 switching, Q2 always on), the exciter drive can reduce total power dissipation and operate more efficiently than a standard two-switch exciter drive, which alternates between states 1&2 (alternating between FIG. 2 and FIG. 3 with Q1 and Q2 both switching).

Alternating between stares 1&3 or states 1&4 is similar in total power dissipation to a single-switch exciter drive, with only one switching transistor and one flyback diode. An additional control concept which can more evenly distribute power dissipation in the exciter drive circuitry during single-switch mode is to operate for some time alternating between states 1&3 (Q1 on, Q2 switching), then operate for some time alternating between Mode 1&4 (Q1 switching, Q2 on). The timing of the switching between these two modes 1&3 and 1&4 can be optimized for thermal performance. There are conditions when state 2 of FIG. 3 is still needed, so the controller 116 can use these considerations to determine which modes and states to use at any given time: state 2 (FIG. 3) is needed during overvoltage fault conditions when exciter energy must be removed quickly; and state 2 (FIG. 3) may be needed during high-speed conditions and/or low exciter current conditions when exciter supply voltage Vsupply (in line 108) is larger and generator gain is larger, which causes the control duty cycle to be very small for single-switch mode, which can cause missed switching cycles, which can cause increased modulation in the generator output voltage.

The methods and systems of the present disclosure, as described above and shown in the drawings, provide for one switch operation of a two-switch H-bridge topology, with fault protection and thermal management functions. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
    a two-switch H-bridge topology including:
        a first switch with a first gate drive connected to control on and off states of the first switch;
        a second switch with a second gate drive connected to control on and off states of the second switch;
        a first flyback diode connected in series between an exciter load negative node and a voltage supply line;
        a second flyback diode connected in series between an exciter load positive node and a voltage return line, wherein the first and second flyback diodes are each oriented to provide a flyback current path; and
        an exciter winding connected from a first node between the first switch and the second flyback diode to a second node between the first flyback diode and the second switch; and
    a controller connected to independently (i) control the first gate drive with a first pulse width modulation (PWM) command and (ii) control the second gate drive with a second PWM command in a mode wherein the first switch is always on while the second switch cycles as a duty-cycle-controlled switch element for the exciter winding.

2. The system as recited in claim 1, further comprising a first transformer having a primary winding operatively coupled to energize a secondary winding, wherein the secondary winding is operatively connected to the first gate drive.

3. The system as recited in claim 2, wherein the secondary winding connects between the first gate drive and the first node.

4. The system as recited in claim 2, further comprising a second transformer having a primary winding operatively coupled to energize a secondary winding, wherein the secondary winding of the second transformer is operatively connected to the second gate drive.

5. The system as recited in claim 4, wherein the secondary winding of the second transformer connects between the second gate drive and the voltage return line.

6. The system as recited in claim 5, wherein a first AND gate is connected to control the first gate drive, wherein the first AND gate has a first input for a carrier signal and a second input for the first PWM command.

7. The system as recited in claim 6, wherein the first AND gate connects to a first terminal of the primary winding of the first transformer through a first amplifier.

8. The system as recited in claim 7, wherein the first AND gate connects to a second terminal of the primary winding of the first transformer through a first inverting amplifier.

9. The system as recited in claim 8, wherein a second AND gate is connected to control the second gate drive, wherein the second AND gate has a first input for the carrier signal and a second input for the second PWM command.

10. The system as recited in claim 9, wherein the second AND gate connects to a first terminal of the primary winding of the second transformer through a second amplifier.

11. The system as recited in claim 10, wherein the second AND gate connects to a second terminal of the primary winding of the second transformer through a second inverting amplifier.

12. The system as recited in claim 1, wherein the controller includes machine readable instructions configured to cause the controller to switch the first switch to off during a fault.

13. The system as recited in claim 1, wherein the controller includes machine readable instruction configured to cause the controller to change modes so the second switch remains on while the first switch acts as the duty-cycle-controlled switch element.

14. The system as recited in claim 13, wherein the controller includes machine readable instruction configured to cause the controller to change modes between having the first switch or the second switch acting as the duty-cycle-controlled switch element.

15. The system as recited in claim 14, wherein the controller includes machine readable instruction configured to cause the controller to change modes to manage thermal performance of the two-switch h-bridge topology.

16. A method comprising:
    operating a two-switch h-bridge topology that includes:
        a first switch with a first gate drive connected to control on and off states of the first switch;
        a second switch with a second gate drive connected to control on and off states of the second switch;
        a first flyback diode connected in series between an exciter load negative node and a voltage supply line;
        a second flyback diode connected in series between an exciter load positive node and a voltage return line, wherein the first and second flyback diodes are each oriented to provide a flyback current path;
        an exciter winding connected from a first node between the first switch and the second flyback diode to a second node between the first flyback diode and the second switch; and
        a controller;
    wherein operating the two-switch h-bridge topology includes independently (i) controlling the first gate drive with a first pulse width modulation (PWM) command from the controller and (ii) controlling the second gate drive with a second PWM command from the controller in a mode wherein the first switch is always on while the second switch cycles as a duty-cycle-controlled switch element for the exciter winding.

17. The method as recited in claim 16, further comprising switching the first switch to off during a fault.

18. The method as recited in claim 16, further comprising changing modes so the second switch remains on while the first switch acts as the duty-cycle-controlled switch element.

19. The method as recited in claim 18, further comprising changing modes between having the first switch or the second switch acting as the duty-cycle-controlled switch element.

20. The method as recited in claim 19, wherein changing the modes is performed to manage thermal performance of the two-switch h-bridge topology.

* * * * *